United States Patent [19]
Akatsuka

[11] Patent Number: 5,315,575
[45] Date of Patent: May 24, 1994

[54] OPTICAL INFORMATION RECORDING APPARATUS

[75] Inventor: Yuichiro Akatsuka, Tokyo, Japan

[73] Assignee: Olympus Optical Co., Ltd., Tokyo, Japan

[21] Appl. No.: 826,469

[22] Filed: Jan. 27, 1992

[30] Foreign Application Priority Data

Jan. 28, 1991 [JP] Japan .................. 3-025248

[51] Int. Cl.$^5$ .................. G11B 7/125; G11B 21/10
[52] U.S. Cl. .................. 369/112; 369/116; 369/44.13
[58] Field of Search .......... 369/112, 116, 107, 100, 369/119, 126, 121, 122, 44.13, 44.14

[56] References Cited

U.S. PATENT DOCUMENTS

| | | | |
|---|---|---|---|
| 4,087,651 | 2/1978 | Taneda et al. | 369/112 |
| 4,209,793 | 6/1980 | Ueno | 369/112 |
| 4,656,618 | 4/1987 | Kaku et al. | 369/44.38 |
| 4,730,293 | 3/1988 | Pierce et al. | 235/462 |
| 5,012,464 | 4/1991 | Vedder et al. | 369/112 |
| 5,043,965 | 8/1991 | Iida et al. | 369/112 |
| 5,247,504 | 9/1993 | Akatsuka | 369/44.38 |

FOREIGN PATENT DOCUMENTS

2141932 5/1990 Japan.
2206069 8/1990 Japan.

OTHER PUBLICATIONS

T. Ishida, et al., "High Speed Optical Card Reader/Writer using Two Optical Sources," Electric Telecommunication Society at the National Great Autumn Meeting, C-325, p. 4-265, 1989.

*Primary Examiner*—Paul M. Dzierzynski
*Assistant Examiner*—Drew A. Dunn
*Attorney, Agent, or Firm*—Stevens, Davis, Miller & Mosher

[57] ABSTRACT

An optical information recording apparatus, in which an information recording light bream emitted from a laser diode is divided into a plurality of light beams and the light intensities of the divided light beams are modulated by driving liquid-crystal cells formed in a control panel so as to record optical information on a plurality of data tracks and in a plurality of data pits on each of the plurality of data tracks simultaneously. Therefore, according to the present invention, it is possible to make the information recording speed increase without making the apparatus large in size and expensive in cost.

13 Claims, 6 Drawing Sheets

FIG_1
PRIOR ART

FIG._2
PRIOR ART

FIG_3

FIG. 4

FIG_5

FIG_6

OPTICAL INFORMATION RECORDING APPARATUS

BACKGROUND OF THE INVENTION

1. Field of the Invention

The present invention relates to an optical information recording apparatus for use in an optical information recording medium such as optical card, optical disc and opto-magnetic disc. Particularly, the present invention relates to an optical information recording apparatus by which optical information can be recorded on the medium with high speed.

2. Description of the Related Art

In apparatuses for recording/reproducing optical information on/from optical information recording medium such as optical card, it is arranged that the optical information recording medium and an optical head are relatively moved to each other when optical information is recorded and/or reproduced on/from the optical card. Therefore, information recording speed and information reproducing speed are determined depending upon a relative moving speed of the information recording medium and the optical head. When optical information is recorded and/or reproduced only on/from a single track, it is not possible to make the information recording and/or reproducing speed high.

In U.S. Pat. No. 4,730,293, Japanese Patent Preliminarily Publications No. 2-141932 and 2-206069, and Papers C-325 of the Electric Telecommunication Society at the National Great Autumn Meeting in 1989 of "High Speed Optical Card Reader/Writer using Two Optical Sources", optical information recording/reproducing apparatuses, in which optical information can be reproduced with a high speed, are suggested. In these conventional apparatuses, in order to make the information reproducing speed high, an optical light beam is made incident upon a plurality of data tracks to read out all of the information recorded on the tracks at the same time.

Figure 1:
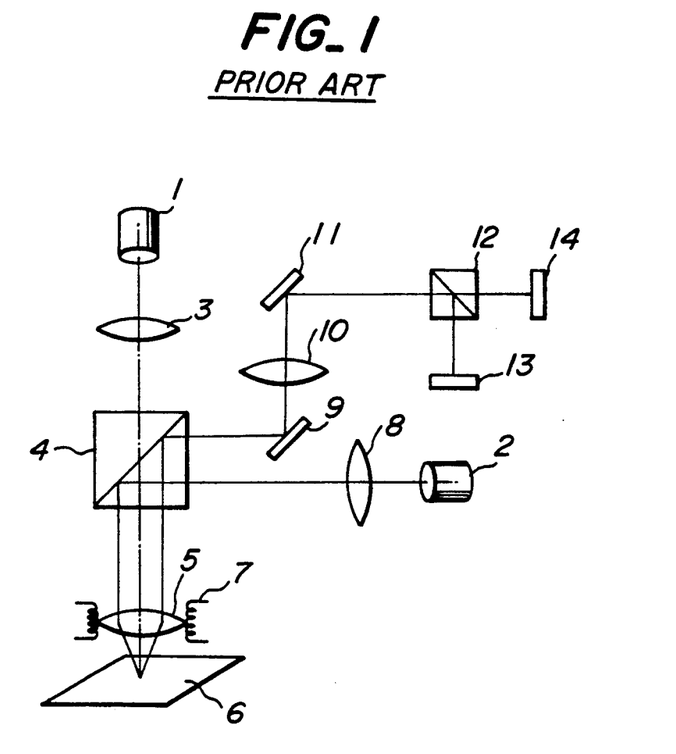
FIG. 1 is a schematic view showing a construction of an optical head of the conventional apparatus for recording/reproducing optical information on/from optical information recording medium.
Figure 2:
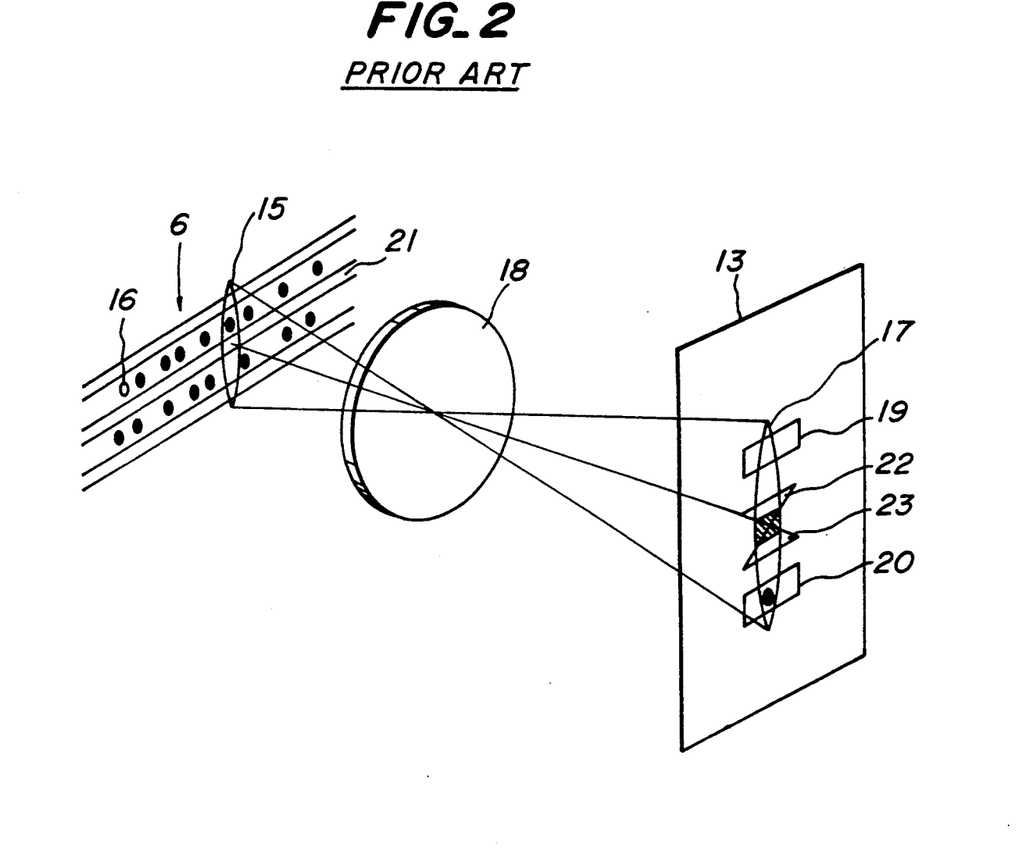
FIG. 2 is a schematic view depicting a construction of a data detection system in the conventional apparatus shown in FIG. 1.

In FIGS. 1 and 2, there are illustrated constructions of an optical head and an optical system for detecting data signal and tracking error signal, respectively, disclosed in the Papers C-325 of the Electric Telecommunication Society at the National Great Autumn Meeting in 1989 of "High Speed Optical Card Reader/Writer using Two Optical Sources". As shown in FIG. 1, the optical head disclosed in the Papers comprises two light sources, i.e. a laser diode 1 and a light emitting diode 2; the light beam emitted from the laser diode 1 is for use in recording information and the light beam from the light emitting diode 2 for use in reproducing information. The information recording light beam emitted from the laser diode 1 is made incident upon an optical card 6 via a collimator lens 3, a polarizing beam splitter 4 and an objective lens 5, which is arranged to be driven in focusing and tracking directions by a lens actuator 7; and the information reproducing light beam emitted from the light emitting diode 2 is made incident via the polarizing beam splitter 4 via a collimator lens 8, then reflected thereby, and the reproducing light beam is made incident upon the objective lens 5 in an off-axial condition to be introduced on the optical card 6; a reflection light beam reflected by the optical card 6 is reflected by the polarizing beam splitter 4 again; and then the reflection light beam is made incident upon a beam splitter 12 via a mirror 9, a condenser lens 10 and a mirror 11; the reflection light beam is divided into two light beams by the beam splitter 12; and then one of the divided light beams is received by a detector 13 for detecting data signal and tracking error signal and the other is by a detector 14 for detecting a focusing error signal.

In such an optical head, as shown in FIG. 2, a light beam spot 15 for reproducing information and a light beam spot 16 for recording information are formed on the optical card 6 so as to be separated from each other. It should be noted that two or more tracks are illuminated by the light beam spot 15; and an image 17 of the light beam spot 15 is formed on the detector 13 via a lens system 18 for detecting the data signal and the tracking error signal. The detector 13 comprises light receiving elements 19 and 20 for reading out information data recorded on data tracks formed on the optical card 6 and triangle-shaped light receiving elements 22 and 23, which are arranged between the light receiving regions 19 and 20, for receiving an image of a track guide 21 formed between the data tracks. Information data recorded on the data tracks is read out on the basis of outputs of the light receiving elements 19 and 20 and the tracking error signal is detected on the basis of outputs of the light receiving elements 22 and 23.

In this optical head, since two data tracks are illuminated by the light bream spot 15, information data recorded on these two data tracks can be reproduced at the same time.

Further, in the conventional apparatuses when information is recorded on the optical card 6, recorded information can be verified at the same time. That is to say, both the light beam for recording information and the light beam for reproducing information are made incident upon the optical card 6 simultaneously; and information is recorded on the data tracks by forming a data pit with the aid of the light beam having a high power, and just thereafter thus recorded information is reproduced with the aid of the light beam for reproducing information on the basis of the tracking and focusing error signals detected from the light beam for reproducing information. On the other hand, when information is reproduced from the optical card 6, only the light beam for reproducing information is made incident upon the optical card 6 to read out information recorded on the two data tracks at the same time, detecting the tracking error signal and the focusing error signal with the aid of the light beam for reproducing information.

However, in the conventional apparatus for recording/reproducing information on/from the optical information recording medium, it is possible to read out information with high speed but impossible to record information with high speed, because recording is performed by modulating a single laser diode 1 to record information on a single data track. As a solution for the slow speed problem when recording information, it can be considered to record information on a plurality of data tracks simultaneously with the aid of a plurality of laser diodes for recording. However, there would occur the problem that the optical head would become large in size and expensive in price.

SUMMARY OF THE INVENTION

The present invention has for its object to provide an optical information recording apparatus in which information can be recorded on the optical information recording medium at high speed without making the optical head large in size and expensive in cost.

In order to carry out the object, the optical information recording apparatus according to the present invention comprises:

- a light source for emitting a main light beam for recording information on an optical information recording medium;
- a light beam dividing means for dividing said main light beam into a plurality of sub-light beams;
- a modulation means for selectively modulating light intensities of respective said sub-light beams in accordance with information to be recorded on the optical information recording medium; and
- a light incident means for making said plurality of sub-light beams incident upon said optical information recording medium in a focus condition.

As stated in the above, since the information recording apparatus according to the present invention comprises a light beam dividing means for dividing the main light beam emitted from a light source into a plurality of sub-light beams and a modulation means for modulating light intensities of the respective sub-light beams in accordance with information to be recorded, it is possible to record information on a plurality of data tracks at the same time. Therefore, optical information can be recorded on the optical information recording medium with a high speed.

DETAILED DESCRIPTION OF THE PREFERRED EMBODIMENT

Figure 3:
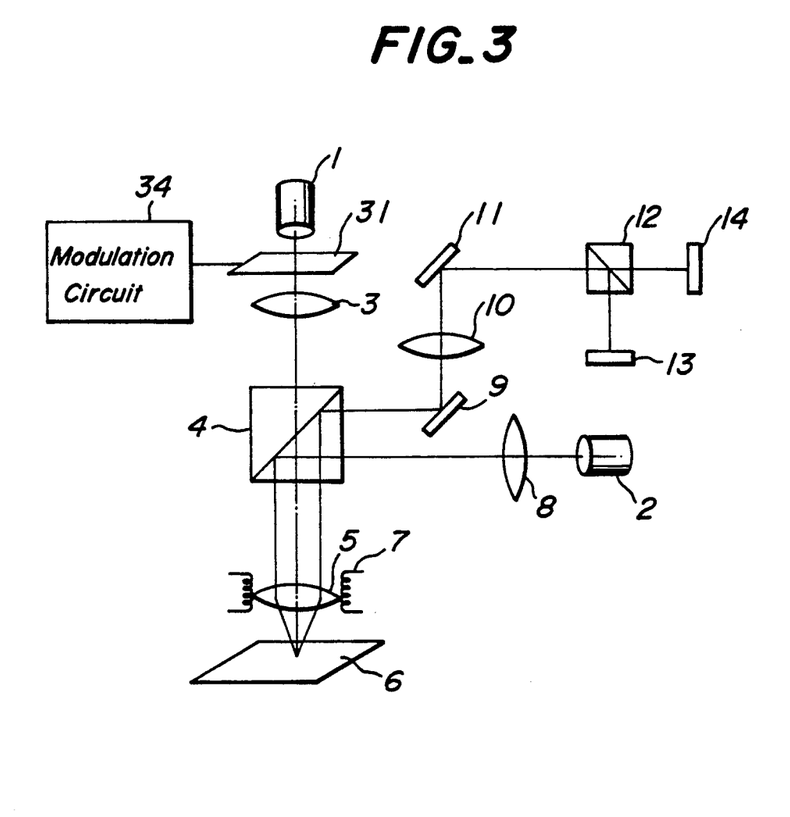
FIG. 3 is a schematic view illustrating a construction of an embodiment of an optical information recording apparatus according to the present invention.

FIG. 3 is a schematic view showing a construction of an embodiment of an information recording apparatus according to the present invention. It should be noted that the same numerical numbers as those of the conventional apparatus shown in FIG. 1 are used for the same elements of the apparatus in FIGS. 3 and 6. As shown in FIG. 3, the apparatus according to the invention comprises a control panel 31, which is arranged between the laser diode 1 and the collimator lens 3, and a modulation circuit 34, in addition to all of the elements provided in the conventional apparatus shown in FIG. 1. It should be noted that the laser diode 1 is arranged backside from the objective side focal point of the collimator lens 3 and the control panel 31 at the objective side focal point of the collimator lens 3.

Figure 4:
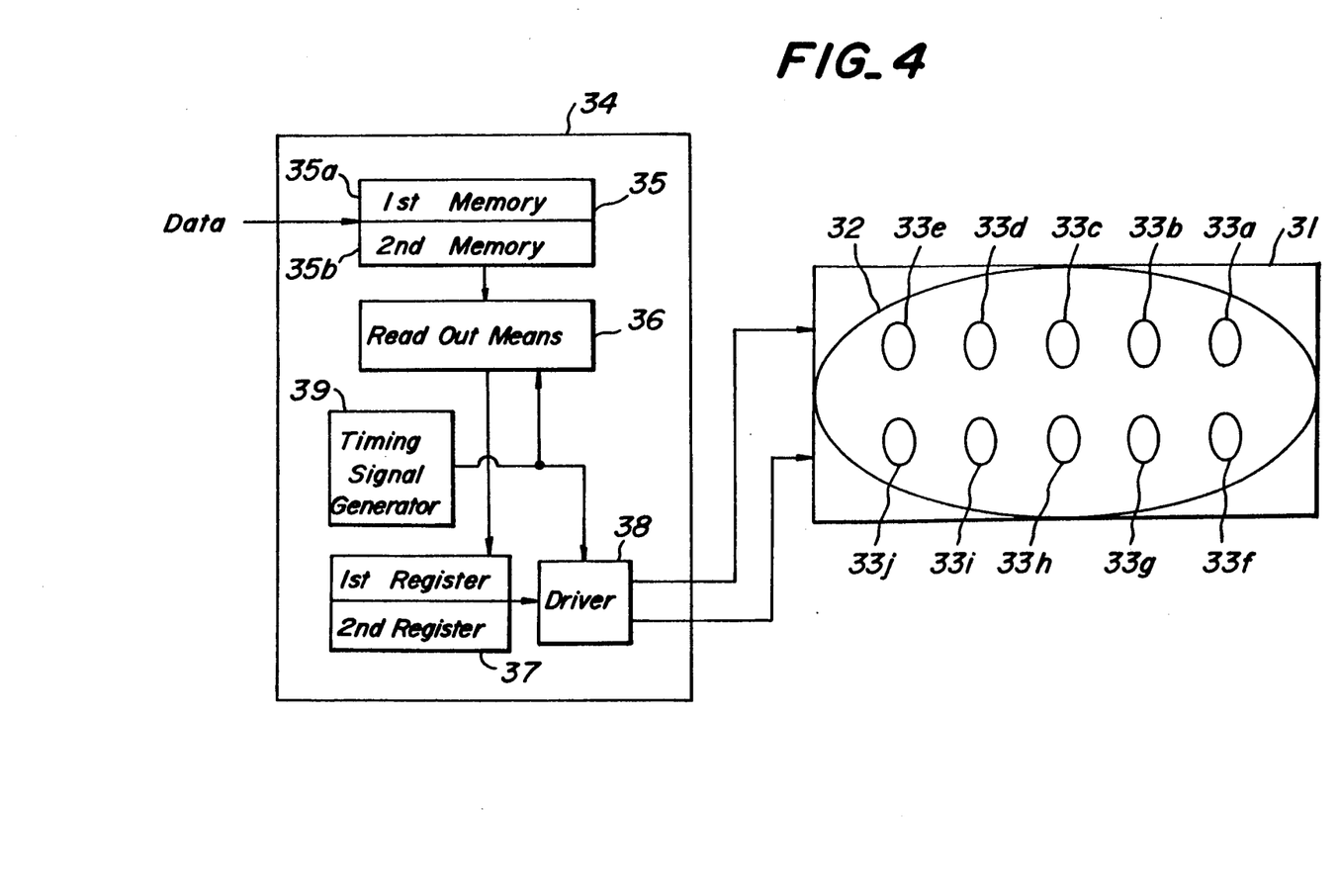
FIG. 4 is a schematic view indicating an embodiment of a control panel provided in the apparatus illustrated in FIG. 3.

FIG. 4 is a schematic view illustrating a construction of the control panel 31 for dividing the light beam emitted from the laser diode 1 into a plurality of sub-light beams and a construction of the modulation circuit 34 for modulating light intensities of the divided sub-light beams. The control panel 31 comprises an ellipse-shaped window region 32 upon which the light beam emitted from the laser diode 1 is made incident. In the ellipse-shaped window region 32, there are arranged a plurality of liquid crystal cells 33. In this embodiment, as shown in FIG. 4, these cells 33 are arranged to form two rows, so that information is recorded on two data tracks simultaneously. It should be noted that the number of rows of the cells 33 corresponds to the number of data tracks on which information can be recorded at the same time.

These liquid crystal cells 33 are selectively driven by a modulating circuit 34 such that the light transmittances of the cells 33 are selectively varied in accordance with information to be recorded on the data tracks formed on the optical card 6. That is to say, the light beam for recording information is divided into ten sub-light beams by the panel 31 and the sub-light beams are selectively transmitted or interrupted by the control panel 31 under the control of the modulation circuit 34 to record information on a plurality of data tracks of the optical card 6 simultaneously. It should be noted that the remaining portion of the control panel 31 is made of light shield material so as to shut out the light beam.

The modulation circuit 34 comprises a block of memories 33 including first and second memories 35a, 35b, in which data to be recorded on the two data tracks are stored, respectively; a data read out means 36 for reading out data memorized in the first and second memories 35a, 35b; a buffer register 37 for storing the thus read out data; a driver 38 for driving the liquid crystal cells 33 in accordance with the output of the buffer register 37; and a timing signal generating means 39, whose output is supplied to the read out means 36 and the driver 38, and when the timing signal is generated the data stored in the memories are read out by the means 36 and the driving signals are sent to the liquid crystal cells 33 from the driver 38.

In this embodiment, optical information is recorded with the aid of a modified frequency modulation (MFM) method with the minimum pit distance of 5 $\mu$m. According to the modulation rule of MFM method, there are three kinds of pit distance, i.e. 5 $\mu$m, 7.5 $\mu$m and 10 $\mu$m. These pit distances correspond to data of "1,0,1", "1,0,0,1" and "1,0,0,0,1" to be recorded on the optical card 6. It should be noted that "1" means an existence of a data pit and "0" means an absence of a data pit.

As clear from FIG. 4, in the control panel 31 are provided two rows of liquid crystal cells 33 so as to correspond to the number of tracks on which information is recorded at the same time. In each row of liquid crystal cells are arranged five liquid crystals, i.e. liquid crystals 33a to 33e for the first row and 33f to 33j for the second row. The number of cells arranged in one row corresponds to the maximum pit distance. The width of each cell in a track direction is about half of the minimum pit distance.

Figure 5:
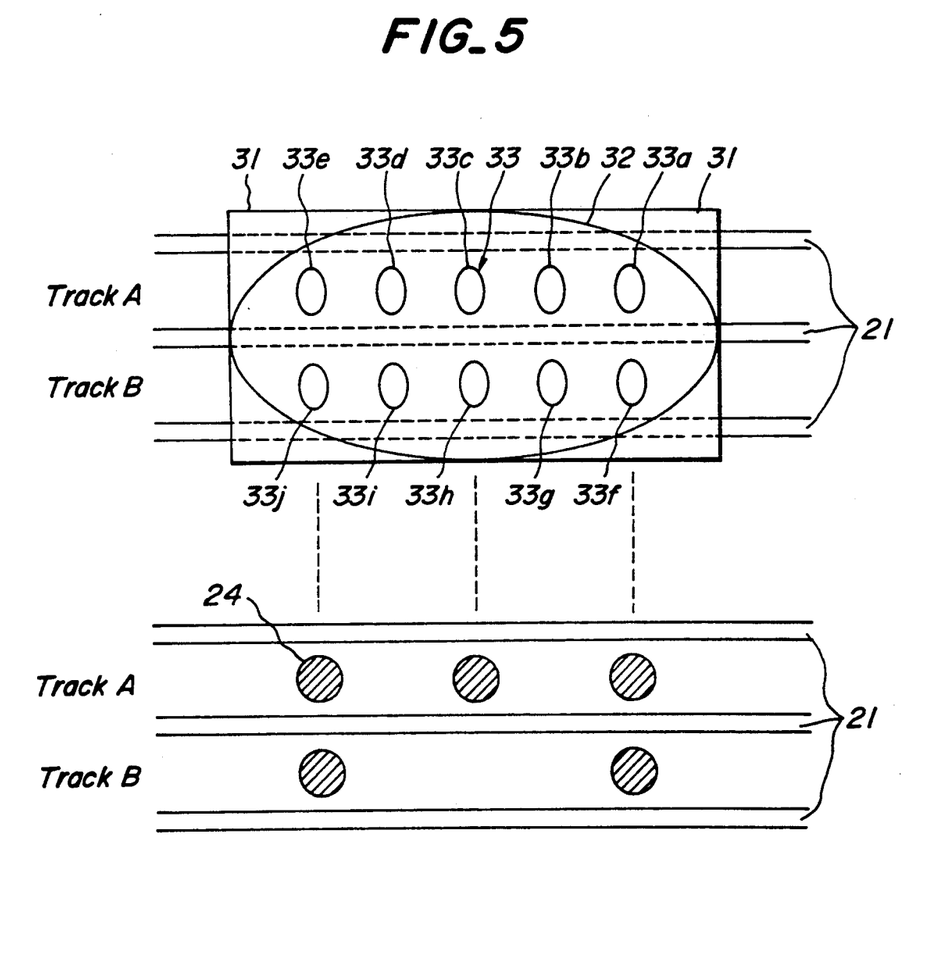
FIG. 5 is a schematic view representing the control panel indicated in FIG. 4 and data tracks formed in an optical information recording medium, which is for explaining an operation of the apparatus shown in FIG. 3.

An information recording operation of this embodiment of the apparatus according to the invention will be explained below, referring to FIG. 5, in which the control panel 31 and the relevant data tracks formed on the optical card 6 are indicated.

It should be noted that during information recording on the optical card 6, the optical card 6 is moved from the left side to the right side in the figures at a speed of 500 mm/sec, so that data pits 24 are formed on the data tracks from right side to left side in with the aid of light beams being passed through the liquid cells 33 of the control panel 31, which are selectively driven to transmit the main light beam from the laser diode 1.

All of the liquid crystal cells 33a to 3j are controlled by the modulation circuit 34 to be opaque before information is started to be recorded, so that no light beam is made incident upon the optical card 6; and during the time information is being recorded, liquid crystal cells corresponding to information to be recorded on the data tracks A and B are driven by the circuit 34 so as to selectively transmit the light beam therethrough. For instance, as shown in FIG. 5, out of the liquid crystal cells 33a to 33e for recording information on the data track A, the crystal cells 33a, 33c and 33e are driven so as to transmit the light beam and 33b and 33d are to be opaque; and in the liquid crystal cells 33f to 33j for the track B, the crystal cells 33f and 33j are driven to transmit and 33g, 33h and 33i are opaque.

The light beam is transmitted only through the transmittable cells 33a, 33c, 33e, 33f and 33j to form data pits 24 on the tracks A and B of the optical card 6. The time period for driving the liquid cells 33 to be transmittable, i.e. the time period during the selected light beams are made incident upon the optical card 6 for recording information, depends on the moving speed of the optical card 6 and the power of the laser diode 1. In this embodiment, the time period is arranged to be 1 μs; therefore, information for 10 pits (2×5) can be recorded on the optical card 6 by illuminating the light beams on the data tracks for the time period of 1 μs.

Since the control panel 31 has its width in the track extending direction of 12.5 um (2.5 um×5), the next recording operation should be started from a position separated from the first recording position by 12.5 μm. However, at a point of time that the first information recording operation has been finished, that is to say, 1 μsec after recording is started, the optical card 6 has moved to the right side by the distance of 0.5 μm. Therefore, the next recording operation should start at the point of time 24 μsec thereafter, to which the optical card 6 has been moved by 12.5 μm. In such a manner, information can be recorded at every 25 μsec on the two data tracks of the optical card 6 simultaneously in a successive manner.

The present invention is not limited to the above explained embodiment, but many modifications or alterations can be applied therefor. For instance, in the above embodiment, the tracking servo control is performed in the same manner as that in the conventional apparatus shown in FIGS. 1 and 2. However, it may be possible to arrange such that a mark is formed on the control panel 31 and the tracking servo control is performed by detecting a relative positional relation between the mark and the guide track formed on the optical card 6. More concretely speaking, at the center position of the control panel 31 is formed the mark, through which the light beam can be transmitted but reduced; an image of a guide track 21 on the optical card 6 is formed on the photo detector 13 through the mark; and then tracking servo control can be performed on the basis of the output of the light receiving elements arranged in the photo detector 13.

Further, in the above-mentioned embodiment, it is arranged that information can be recorded on two of the data tracks at the same time; and ten data pits are formed on the data tracks simultaneously therefor. However, it may be possible to arrange that three or more data tracks are simultaneously illuminated by the divided light beams and twelve or more data pits are formed on the card 6, in accordance with a light illuminated area of the control panel 31. In such cases, it is possible to speed up the time for recording information.

Figure 6:
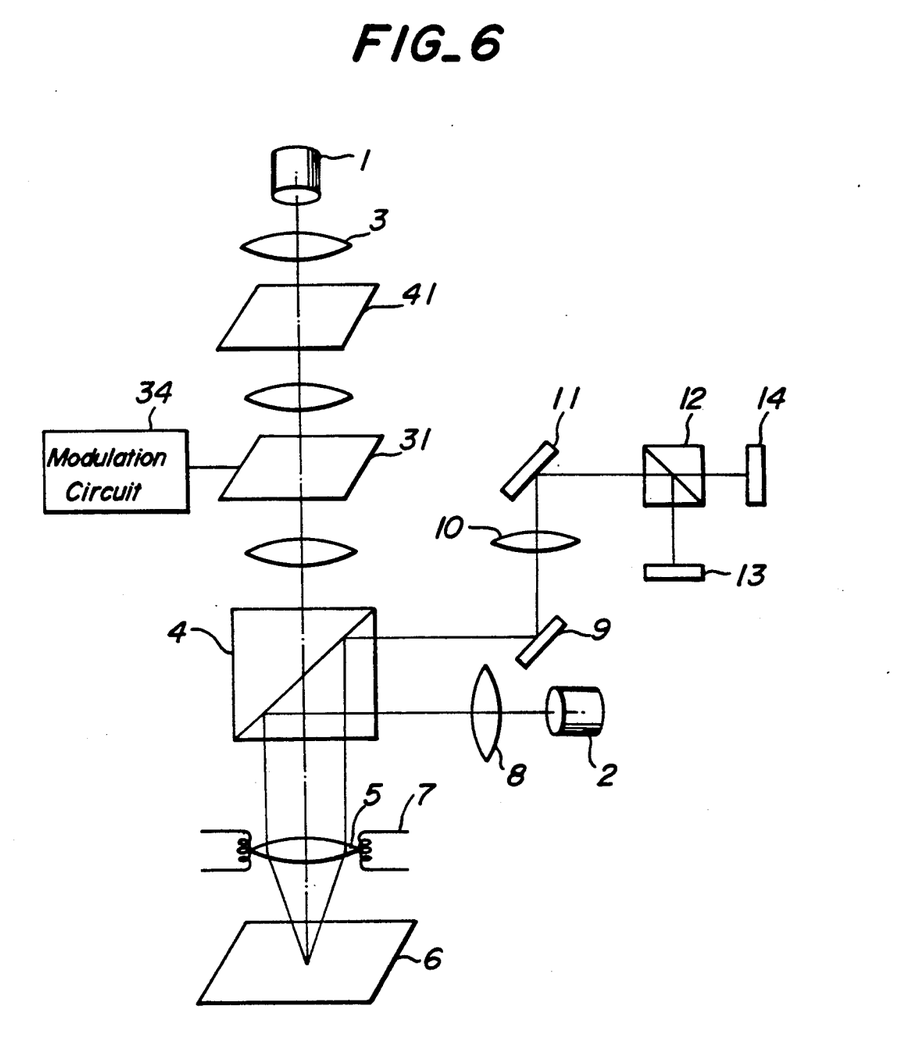
FIG. 6 is a schematic view showing a construction of the other embodiment of an optical information recording apparatus according to the present invention.

Furthermore, in the embodiment mentioned in the above, the laser diode 1 is arranged in rear of the object side focal point of the collimator lens 3, so that the light beam 32 is made incident upon the optical card 6 in a defocused manner. However, it may be possible to modify the arrangement of the laser diode 1 and the control panel 31 in such a manner that the laser diode 1 is arranged at the object side focal point of the collimator lens 3; and a light beam dividing element 41, such as a grating, is arranged between the laser diode 1 and the control panel 31, so that one of the diffraction light beams diffracted by the grating 41 (+1st order diffraction light beam) is made incident upon the liquid crystal cells 33a to 33e for recording information on the data track A, and the other one (−1st order diffraction light beam) upon the liquid crystal cells 33f to 33j, for recording information on the data track B. FIG. 6 shows an arrangement of optical elements constituting the modification.

Moreover, it may be possible to arrange a plurality of laser diodes and a plurality of control panels corresponding to the number of the laser diodes to record information on three or more data tracks of the optical card 6 simultaneously. In addition, if the length of the control panel is arranged to be the same as that of the track length, it is possible to record information without moving the optical card 6 but by moving only the light beam for recording along with the data track.

Moreover, the modulation is not limited to the MFM method in the present invention. In case use is made of another modulation method, the number of liquid crystal cells on the control panel should be modified in accordance with the modulation method to be used, in order to apply the present invention in an effective manner.

Furthermore, the control panel 31 may be constituted of a Kerr cell shutter or an optical shutter, by which the transmission of the light beam 32 can be controlled by selectively rotating the plane of polarization thereof.

Moreover, the present invention may be effectively applied to not only to the optical card but also to other optical information recording media such as an optical disc or an opto-magnetic disc.

As stated in the above, according to the present invention, since information can be recorded on a plurality of data tracks at the same time, the information recording speed can be increased without making the apparatus large in size and expensive in cost.

What is claimed is:
1. An optical information recording apparatus comprising:
   a light source for emitting a main light beam for recording information on an optical information recording medium;
   a light beam dividing means for dividing said main light beam into a plurality of sub-light beams in a first direction and a second direction, said first direction corresponding to a tracking direction which is perpendicular to a track extended direction on the optical information recording medium, said second direction coinciding with said track extended direction, so that information can be recorded on a plurality of data tracks formed on said optical information recording medium and in a plurality of data pits on each of said plurality of data tracks at the same time;

a modulation means for selectively modulating light intensities of said plurality of sub-light beams in accordance with information to be recorded on the optical information recording medium; and a light incident means for making said plurality of sub-light beams incident upon said optical information recording medium in a focus condition.

2. An optical information recording apparatus according to claim 1 wherein:

said light beam dividing means comprises a control panel in which a plurality of liquid crystal cells are arranged in a matrix manner; through the liquid crystal cells, said main light beam is selectively transmitted to be divided into the plurality of sub-light beams.

3. An optical information recording apparatus according to claim 2, wherein:

light transmittances of said plurality of liquid crystal cells are controlled by said modulation means in accordance with information to be recorded, in order to modulate said light intensities of said plurality of sub-light beams.

4. An optical information recording apparatus according to claim 3, wherein:

said modulation means comprises a memory means for memorizing information data to be recorded, a read out means for reading out information data memorized in the memory means, a buffer register for storing information data read out by said read out means, a driver for selectively driving said plurality of liquid crystal cells in accordance with information data stored in the buffer register, and a timing signal generating means for generating timing signals by which information is initiated to be read out by said read out means and said, plurality of liquid crystal cells are initiated to be driven by said driver.

5. An optical information recording apparatus according to claim 4, wherein:

said memory means comprises first and second memories, the first memory is for memorizing information data to be recorded on a first data track and the second memory is for memorizing information data to be recorded on a second data track; and said buffer register comprises first and second registers, the first register is for storing information data memorized in the first memory and the second register is for storing information data memorized in the second memory; so that information can be recorded on said first and second data tracks at the same time.

6. An optical information recording apparatus according to claim 4, wherein:

said control panel is arranged between said light source and said optical information recording medium.

7. An optical information recording apparatus according to claim 6, wherein:

said light incident means comprises a collimator lens for making said plurality of sub-light beams parallel; and said light source is arranged at a position rear of the objective side focal point of the collimator lens; and the control panel is arranged at the objective side focal point of the collimator lens.

8. An optical information recording apparatus according to claim 4, wherein:

said light beam dividing means comprises a grating for diffracting said main light beam in a first direction corresponding to the track extended direction on the optical information recording medium to divide the main light beam into ± first order diffraction light beams, one of which is made incident upon a first row of plurality of liquid crystal cells formed on the control panel and the other one of which is made incident upon a second row of plurality of liquid crystal cells.

9. An optical formation recording apparatus according to claim 8, wherein:

said light source is arranged at the objective side focal point of the collimator lens; and said grating is arranged between the collimator lens and the control panel.

10. An optical information recording apparatus according to claim 1, wherein;

said modulation means comprises a plurality of Kerr cell shutters.

11. An optical information recording apparatus according to claim 1, wherein:

said modulation means comprises a plurality of optical shutters.

12. An optical information recording apparatus according to claim 2, wherein:

said plurality of liquid crystal cells are arranged to form a plurality of rows in a direction corresponding to the track extended direction on the optical information recording medium; each row is constituted of five liquid crystal cells; and data pits are formed on the tracks of the optical information recording medium with the aid of a modulated frequency modulation method.

13. An optical information recording apparatus according to claim 2, wherein:

a minimum distance between said data pits is arranged to be about 5 $\mu$m and a maximum distance between said data pits about 10 $\mu$m; and said plurality of liquid crystal cells are arranged such that the width of each cell in the direction corresponding to the track extended direction is about half of said minimum distance.

* * * * *